United States Patent [19]
Nassar et al.

[11] Patent Number: 6,138,713
[45] Date of Patent: Oct. 31, 2000

[54] SOLENOID ASSEMBLY FOR AN AUTOMATIC TRANSMISSION OF A MOTOR VEHICLE AND RELATED METHOD

[75] Inventors: Roy S. Nassar, Rochester; Thomas D. Nogle, Troy; Mohamed Fahs, Bloomfield Hills; Charles J. Redinger, Macomb; Charles K. Streetman, Sterling Heights, all of Mich.

[73] Assignee: DaimlerChrysler Corporation, Auburn Hills, Calif.

[21] Appl. No.: 09/295,713

[22] Filed: Apr. 21, 1999

[51] Int. Cl.[7] .............................. F15B 13/08; F16K 31/06
[52] U.S. Cl. ................................. 137/596.17; 251/129.14; 251/129.2
[58] Field of Search ................ 137/596.17; 251/129.14, 251/129.2

[56] References Cited

U.S. PATENT DOCUMENTS

| | | | |
|---|---|---|---|
| 1,819,461 | 8/1931 | Frank | 251/129.2 |
| 1,883,957 | 10/1932 | Koch et al. | 251/129.2 |
| 4,893,652 | 1/1990 | Nogle et al. | 137/596.17 |
| 4,939,928 | 7/1990 | Carle et al. | 73/118.1 |
| 5,115,698 | 5/1992 | Leising et al. | 74/868 |
| 5,174,334 | 12/1992 | Nogle | 137/596.17 |
| 5,458,545 | 10/1995 | Adam et al. | 475/120 |
| 5,603,482 | 2/1997 | Mott et al. | 251/129.2 |
| 5,722,456 | 3/1998 | Schumacher et al. | 137/596.17 X |
| 5,823,071 | 10/1998 | Petrosky et al. | 74/606 R |

*Primary Examiner*—Gerald A. Michalsky
*Attorney, Agent, or Firm*—Marc Lorelli

[57] ABSTRACT

A solenoid assembly for an automatic transmission of a motor vehicle. The solenoid assembly includes a housing having a core opening passing vertically therethrough. A valve is mounted within the housing. The valve is operative in a vented state and a non-vented state. The valve includes a plunger movable between a first position for establishing the vented state and a second position for establishing the non-vented state. An armature is associated with the valve and is movable in response to the presence and absence of a magnetic field for selectively moving the plunger between the first and second positions. An electromagnetic arrangement for creating the magnetic field includes a core and an energizable coil. The core is inserted into the core opening from an underside of the housing. A first retaining member retains a portion of the core against the underside of the housing. A variable transducer is used to establish a reference plane including two upper surfaces of the coil. The transducer is used to adjust the armature relative to an associated valve such that a predetermined air gap is established between one of the upper surfaces of the coil and the armature.

12 Claims, 5 Drawing Sheets

SOLENOID ASSEMBLY FOR AN AUTOMATIC TRANSMISSION OF A MOTOR VEHICLE AND RELATED METHOD

BACKGROUND OF THE INVENTION

1. Technical Field

The present invention generally pertains to motor vehicles. More particularly, the present invention pertains to a solenoid assembly for an automatic transmission of a motor vehicle and a related method.

2. Discussion

Generally speaking, motor vehicles require three basic components. These components include a power plant (such as an internal combustion engine), a power train, and wheels. The internal combustion engine produces force by the conversion of the chemical energy in a liquid fuel into the mechanical energy of motion (kinetic energy). The function of the power train is to transit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels so that the vehicle may be driven both forward and backward.

Transmissions are generally referred to as manually actuated or automatic transmissions. Manual transmissions generally include mechanical mechanisms for coupling rotating gears to produce different ratio outputs to the drive wheels. Automatic transmissions are designed to take automatic control of the frictional units, gear ratio selection and gear shifting. A thorough description of an exemplary automatic transmission is set forth in commonly assigned U.S. Pat. No. 5,115,698, which is hereby incorporated by reference as if fully set forth herein.

A conventional automatic transmission includes frictional units which couple a rotational input member to one or more planetary gear sets. Other frictional units, typically referred to as brakes, hold members of the planetary gear set stationary during the flow of power. The drive clutch assemblies can couple the rotating input member of the transmission to the desired elements of the planetary gear sets, while the brakes hold elements of these gear sets stationary. The planetary gear sets provide for various ratios of torque and function to ensure that the available torque and the respective tractive power demand are matched to each other.

Modern electronic transmission control systems typically include a plurality of solenoid actuated valves for controlling hydraulic fluid pressures in response to particular transmission conditions. Each of the solenoids includes a terminal that, when energized, actuates a valve which applies or releases a friction element in response to a transmission controller, as is generally disclosed in commonly assigned U.S. Pat. No. 4,893,652, which is hereby incorporated by reference as if fully set forth herein.

While the transmission control systems heretofore employed, including but not limited to those described in U.S. Pat. Nos. 4,893,652 and 5,115,698 have desirable performance characteristics, there is still room for further improvement in the art.

SUMMARY OF THE INVENTION

It is a general object of the present invention to provide an improved solenoid assembly for controlling an automatic transmission of a motor vehicle.

It is another general object of the present invention to provide an improved method of assembling a solenoid assembly.

It is another object of the present invention to provide a solenoid assembly which is inexpensive to manufacture and easy to assemble without error.

It is another object of the present invention to provide a solenoid assembly that is energy efficient and responds quickly.

It is another object of the present invention to provide a solenoid assembly for an automatic transmission of a motor vehicle which incorporates a plurality of rectangular cores and cooperating coils.

It is another object of the present invention to provide a solenoid assembly for an automatic transmission of a motor vehicle which incorporates cores formed from a plurality of stacked plates or laminations.

In one form, the present invention provides a solenoid assembly for an automatic transmission of a motor vehicle. The solenoid assembly includes a housing having a core opening passing vertically therethrough. A valve is mounted within the housing. The valve is operative in a vented state and a non-vented state. The valve includes a plunger movable between a first position for establishing the vented state and a second position for establishing the non-vented state. An armature is associated with the valve and is movable in response to the presence and absence of a magnetic field for selectively moving the plunger between the first and second positions. An electromagnetic arrangement creates the magnetic field. The electromagnetic arrangement includes a core and an energizable coil. A first retaining member retains a portion of the core against the underside of the housing.

In another form, the present invention provides a method of assembling a solenoid assembly for an automatic transmission of a motor vehicle. The solenoid assembly includes a housing, a core disposed in the housing, a valve disposed in the housing, an armature associated with the valve, and an electromagnetic arrangement for creating the magnetic field. The valve has a plunger movable between a first position and a second position. The armature is movable in response to the presence and absence of a magnetic field for selectively moving the plunger between the first and second positions. The electromagnetic arrangement includes a core having an upper surface with first and second portions. The method of assembling the solenoid assembly includes the general steps of:

establishing a reference plane including the first and second portions of the upper surface of the core;

measuring the vertical height of the plunger in the first position relative to the reference plane; and vertically adjusting a first end of the armature such that a predetermined gap exists between the armature when the plunger is in the first position and the armature engages the second portion of the upper surface of the core and the plunger.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
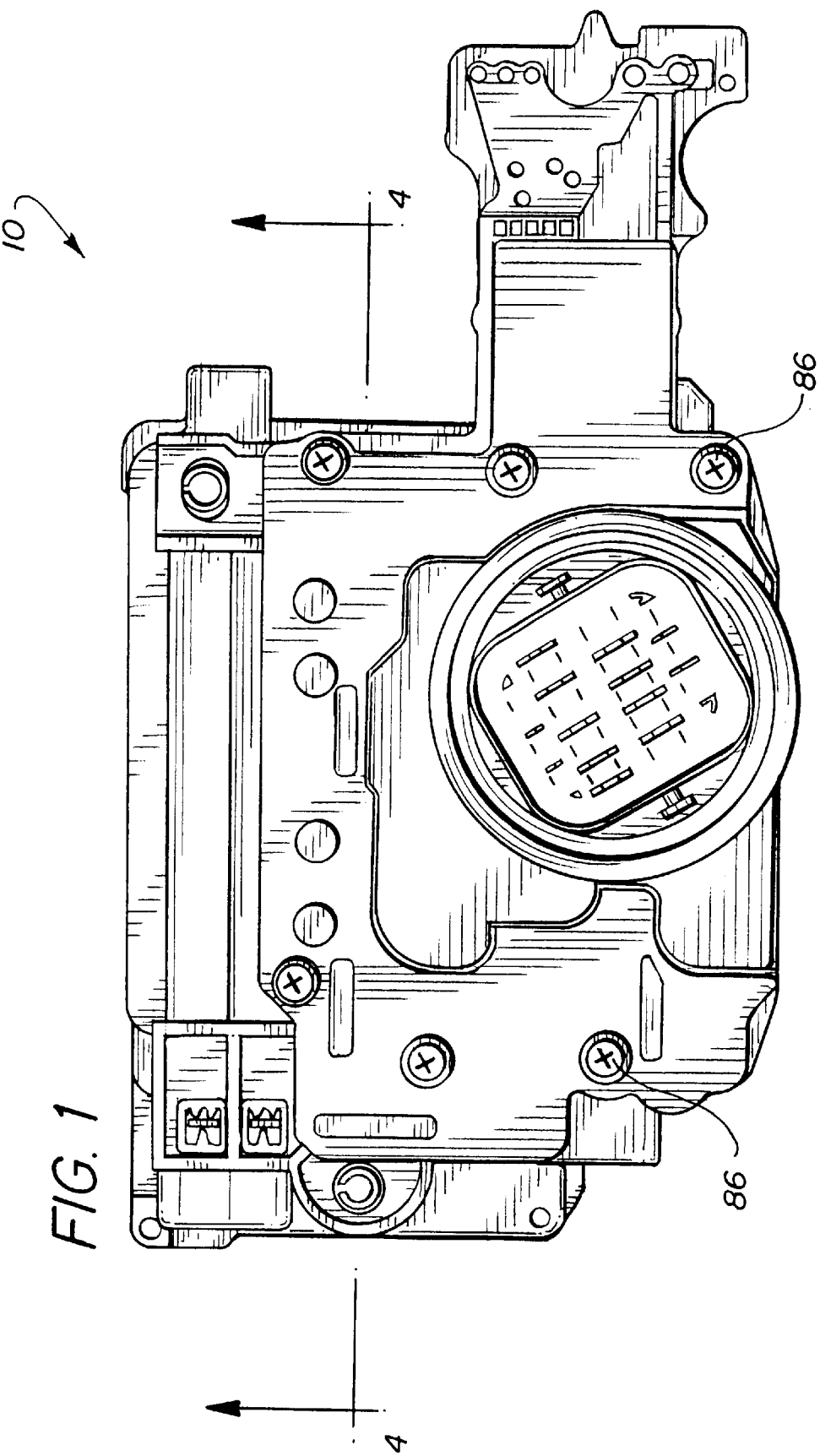
FIG. 1 is a top view of a solenoid assembly constructed in accordance with the teachings of a preferred embodiment of the present invention.

With general reference to drawings, a solenoid assembly constructed in accordance with the teachings of a preferred embodiment of the present invention is generally identified at reference numeral 10. The solenoid assembly 10 is particularly adapted for controlling an automatic transmission of a motor vehicle. However, it will be appreciated by those skilled in the art that the teachings of the present invention may be used for alternative solenoid applications.

The solenoid assembly 10 is shown to generally include a housing 12 and a plurality of valves 14 for controlling the transfer of hydraulic fluid pressures in response to particular transmission conditions by directing the hydraulic fluid through the housing 12. The housing 12 and the valves 14 communicate through a plastic screen carrier 16 to the transmission valve body assembly. The screen carrier 16 functions to filter particulates out of hydraulic fluid passing through the screen carrier 16, to and from the transmission valve body assembly. In a manner known in the art, the screen carrier 16 has torque retainers (not shown) to prevent clamping-load loss due to plastic creep. The screen carrier 16 includes a bead of flexible seal (not specifically shown) to prevent fluid leakage.

The solenoid assembly is mounted to the valve body inside the transmission in a manner well known in the art. A retaining member or retainer plate 17 holds the valves 14 in place and an insulator assembly 19 is mounted to a top of the housing 12. In the exemplary embodiment, O-rings upwardly bias each of the valves 14 and thereby maintain a load on the valves 14 against the retainer plate 17.

Figure 4:
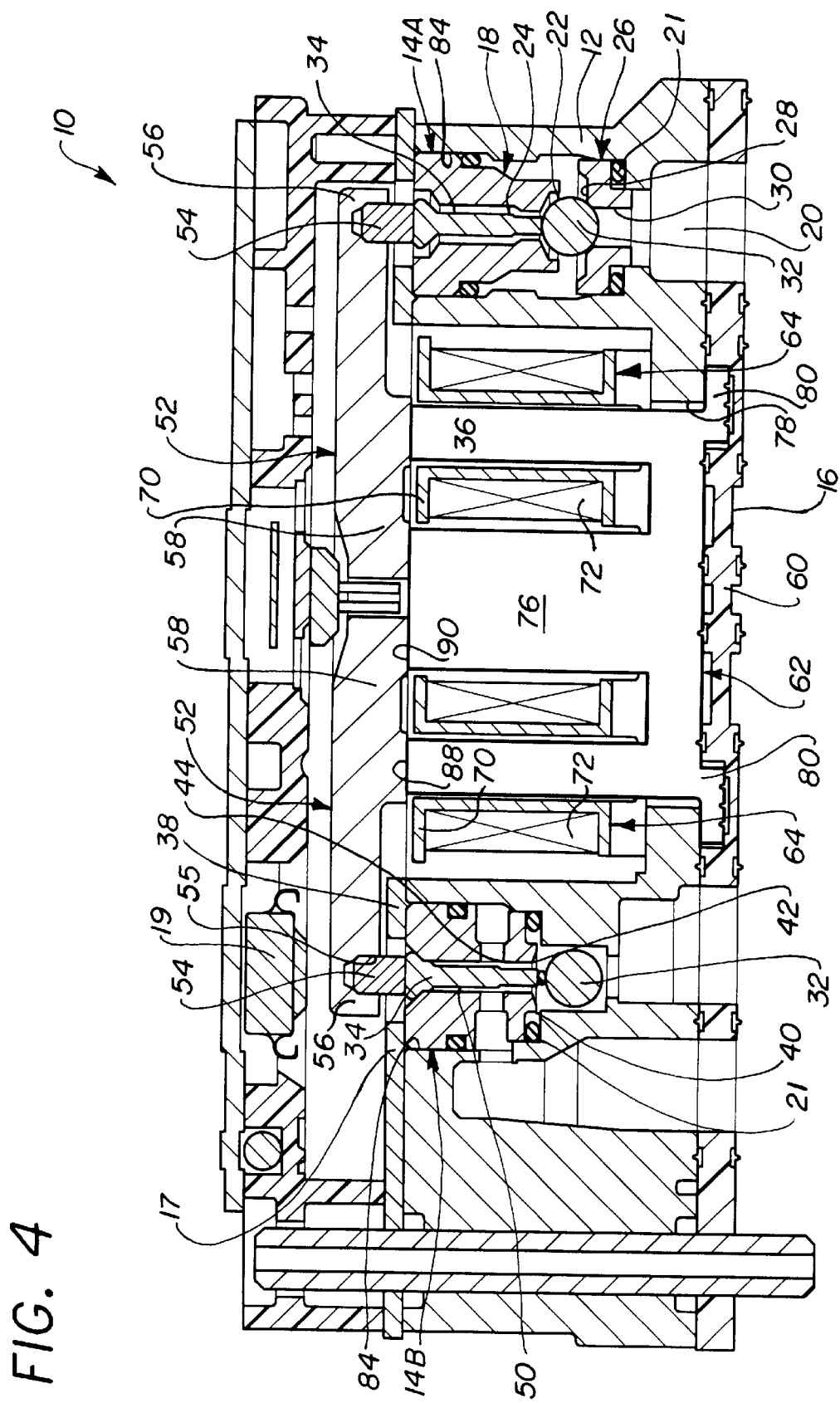
FIG. 4 is a cross-sectional view through one pair of solenoid valves, taken along the line 4—4 of FIG. 1.

The exemplary embodiment of the present invention includes two normally applied valves 14A and four normally vented valves 14B. The cross-sectional view of FIG. 4 illustrates one of the normally applied valves 14A and one of the normally vented valves 14B. As will become more apparent below, FIG. 4 illustrates the normally applied valve 14A energized to a vented state and the normally vented valve 14B energized to an applied state. In a conventional manner, the normally applied and normally vented valves 14A and 14B cooperate to provide a "limp-home" mode of operation in which reverse, second and third ratios may be manually selected in the event of power failure. A limp-home mode of operation is more fully described in U.S. Pat. No. 5,115,698 which has been incorporated by reference. It will be understood that each of the normally applied valves 14A are identical. Similarly, each of the normally vented valves 14B are identical. It will be further understood that the structure and function of the valves 14A and 14B, insofar as the present invention is concerned, is similar to that described generally in U.S. Pat. No. 4,893,652.

Briefly, the normally applied valve 14A shown in FIG. 4 is illustrated to include a valve body 18 mounted in the housing 12 and disposed within a fluid path 20. The valve body 18 defines an upper valve seat 22 and a central passage 24 communicating therethrough. The valve 14A further includes a lower seat element 26 defining a lower seat 28 having a central passage 30 communicating therethrough. A steel ball 32 is disposed within the fluid path and movable between a first position in which fluid may pass through the central passage 24 of the upper valve seat 22 and a second position in which fluid is prevented from passing through central passage 24 of the upper valve seat 22. Likewise, in the first position, flow is prevented in passage 30, while flow is permitted in the passage 30 in the second position. The first position, with the ball 32 pressed against the lower seat 28 (displaced downward) is shown in FIG. 4. In the second position, the steel ball 32 is displaced upward against the seat 22. A plunger 34 having a longitudinal axis aligned with a center of the ball 32 is disposed within a vertically extending channel 36 passing through the valve body 18. The plunger 34 is operated in a manner to be discussed below to move the ball 32 between the first and second positions.

The normally vented valve 14B shown in FIG. 4 includes a valve body 38 having a seating element 40 defining a lower valve seat 42 and having a central passage 44 communicating therethrough. The normally vented valve 14B further includes a plunger 34 and a steel ball 32 which are nearly identical to those of the normally applied valve 14A. The ball 32 is disposed in a fluid path and below the seating element 40. The plunger 34 extends through an axially extending channel 50 defined by the valve body 38. The steel ball 32 is movable between a first position (shown in FIG. 4) downwardly displaced from the valve seat 42 and a second position (not shown) against the valve seat 42. In the first position, the head of the plunger 34 is downward against the seat 38, thereby closing the upper end of the passage 44 so that the valve 14B is applied. In the second position, the valve 14B is vented around the head of the plunger 34. Likewise, in the first position, flow is permitted past the ball 32 into the lower end of the passage 40, and in the second position, flow around the ball 32 is prevented.

An armature 52 is associated with the ball 32 and plunger 34 of each of the valves 14. The armature 52 is movable in a known manner for actuating the associated plunger 34 in response to the presence and absence of a magnetic field. As will be addressed more fully below, an armature pin 54 is press fit into an aperture 55 provided in a first end 56 of the armature 52 and is adapted to selectively engage an upper end of the associated plunger 34. The press fit condition is adjustable, depending on stack conditions. The armature 52 pivots about a second end 58 in response to the presence and absence of the magnetic field.

To provide means for selectively establishing the magnetic field for controlling the armatures 52, the solenoid assembly 10 of the present invention includes an electromagnetic arrangement 60. In the exemplary embodiment, the electromagnetic arrangement 60 is shown to generally include a plurality of cores 62 within the housing 12 and an electrical coil 64 associated with each of the valves 14. In the preferred embodiment, the electromagnetic arrangement 60 includes three cores 62 and six coils 64. One of the cores 62 is shown with two associated coils 64 in FIG. 4. The remaining cores 62 and coils 64 will be understood to be substantially identical.

Figure 2:
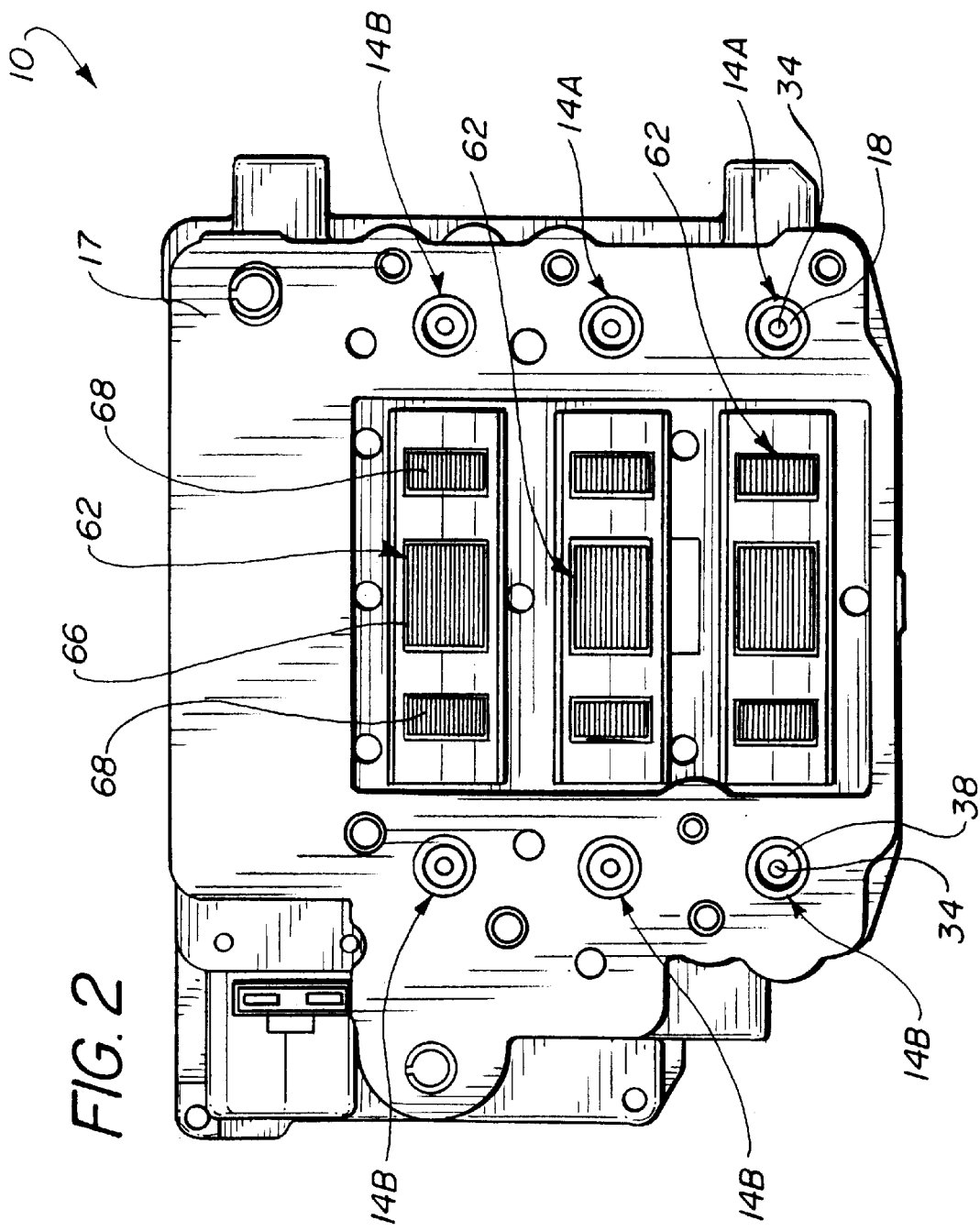
FIG. 2 is top view of the solenoid assembly of the preferred embodiment of the present invention illustrated with the insulator and circuit assembly removed for purposes of illustration.
Figure 3:
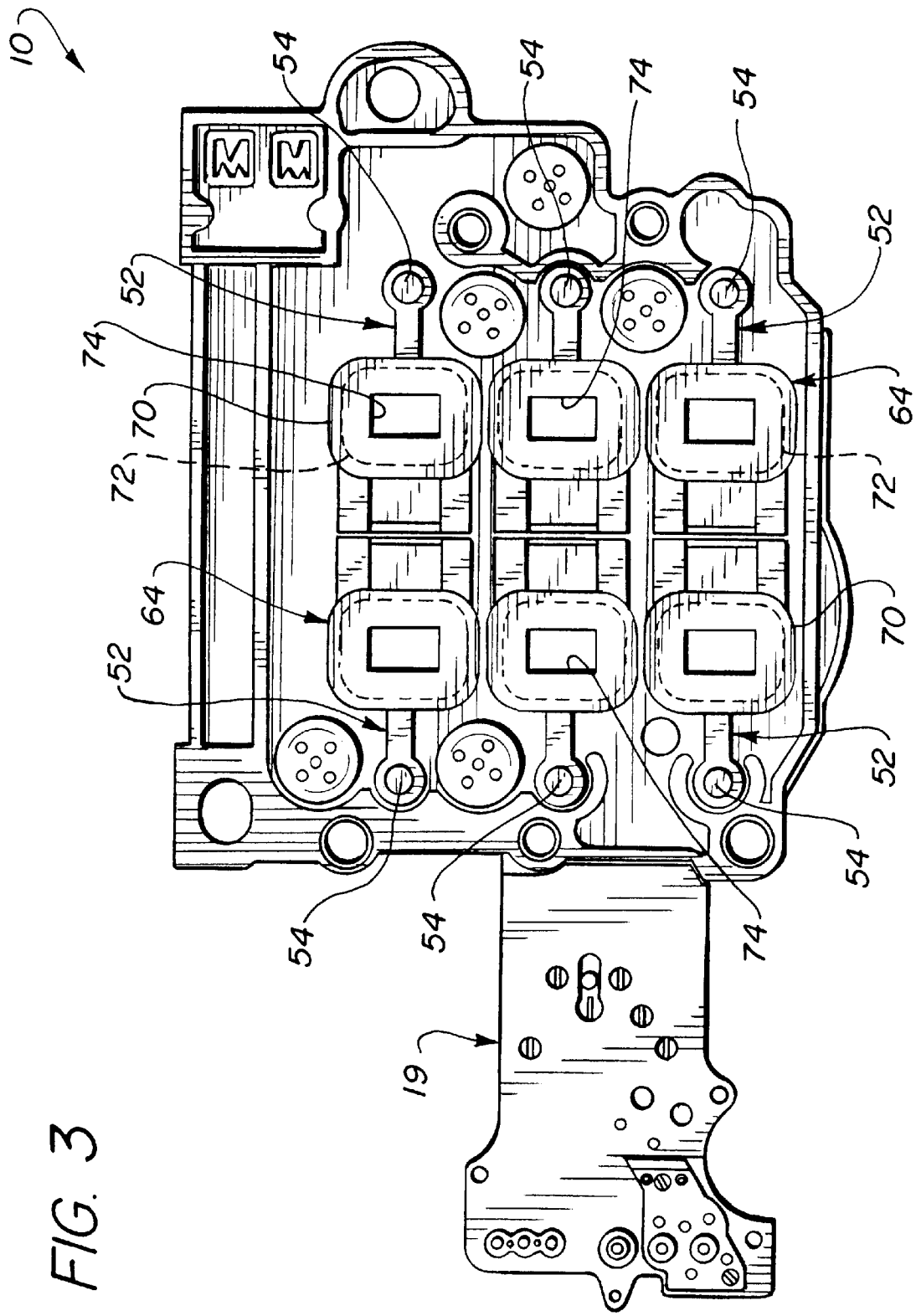
FIG. 3 is a bottom view of the insulator and circuit assembly with the coils of the solenoid assembly of the present invention.

In the preferred embodiment, each core 62 includes an upwardly extending center post 66 and a pair of upwardly extending outer posts 68. As shown most preferably in the top view of FIG. 2, the posts 66 and 68 are generally rectangular in horizontal cross section. Each of the electrical coils 64 of the electromagnetic arrangement 60 includes a plastic coil body 70 and a plurality of copper windings 72. As shown most particularly in FIG. 3, each coil body 70 defines a generally rectangular aperture 74. The rectangular apertures 74 are sized to receive one of the outer posts 68. Each electrical coil 64 includes a pair of terminals (not shown) which plug into an underside of the insulator assembly 19 in a conventional manner. In a known manner, the terminals provide electricity to the plurality of copper windings 72.

In the exemplary embodiment, each of the cores 62 includes a plurality of flat metal plates 76. In the preferred embodiment, the plates 76 are substantially identical and are vertically stacked and retained to one another. In one application, each core 62 includes twenty-four (24) stacked plates 76. However, it will be understood that more or less plates 76 may be used. While not specifically shown, it will be further understood that each plate 76 is semi-pierced to create a small, circular area which protrudes from one side. Adjacent plates 76 are retained through a snug press fit between these areas. A capillary of oil film which results from immersion of the cores 62 in transmission fluid functions as an insulative coating on the plates 76 to minimize electrical contact between adjacent plates 76.

The stacked plates 76 are illustrated to each have a general M-shape which is inverted. Three legs of the stacked plates 76 extend upwardly and cooperate to define the center and outer posts 66 and 68. The stacked plates 76 are more easily manufactured than conventional cylindrical core posts which are typically turned. In addition, the stacked plates 76 increase the amount of magnetic flux created by energizing of an associated electrical coil 64. As a result, clearances between the coil body 70 and the outer posts 68 of the cores 62 can be increased, thereby permitting easier assembly.

As illustrated most clearly in the cross-sectional view of FIG. 4, each of the cores 62 is disposed within an opening 78 which vertically passes through the housing 12. In the preferred embodiment, the plates 76 are formed to include a pair of coplanar horizontally extending segments 80. The segments 80 abut an underside of the housing 12. The screen carrier 16 is secured to the housing 12 with threaded fasteners (not shown) and holds the cores 62 against the housing 12, thereby eliminating the need for separate retaining fasteners.

Figure 5:
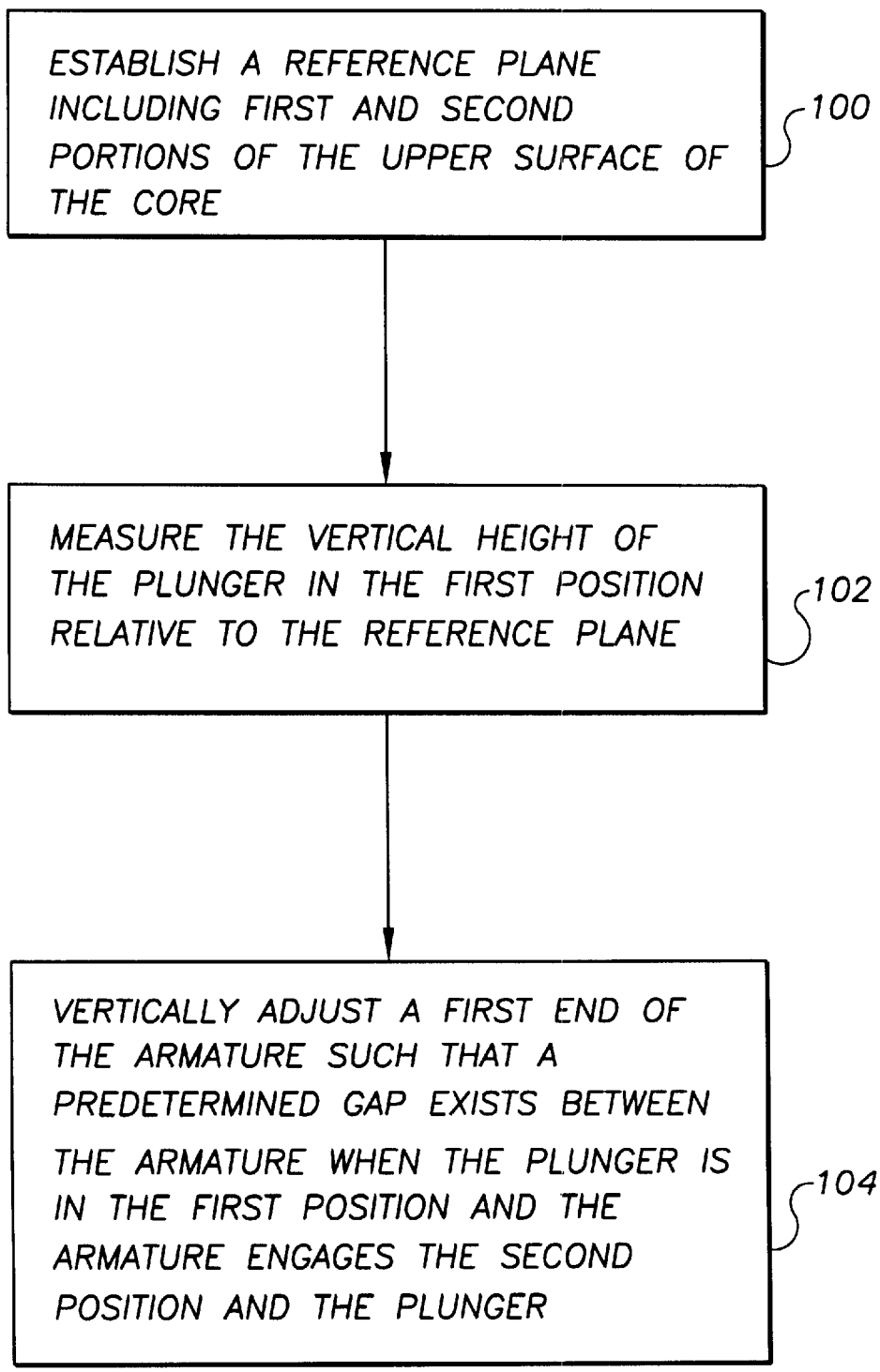
FIG. 5 is a schematic diagram illustrating the general steps of a method of a preferred embodiment of the present invention.

Assembly of the solenoid assembly 10 will now be detailed with continued reference to FIGS. 1 through 4 and additional reference to FIG. 5. After the core plates 76 are stamped and assembled to form the cores, the cores 62 are each inserted into the opening 78 from the underside of the solenoid assembly 10. As noted above, the horizontal segments 80 abut an underside of the housing 12 and the screen carrier 16 holds the cores 62 against the housing 12. The cores 62 are now fixedly located with respect to the housing 12.

The valves 14 are inserted into generally cylindrical apertures 84 provided in the housing 12 from an upper side of the housing 12. The retainer plate 17 is secured to the housing 12 with a plurality of threaded fasteners 86 (shown in FIG. 1). The retainer plate 17 opposes upward movement of the valves 14. As the valves 14 are upwardly biased against the retainer plate 17 by the O-rings 21, the valves 14 are fixedly located relative to the housing 12.

In the exemplary embodiment, it is desirable to maintain a predetermined air gap between the armature 52 and its associated outer post 68 when the second end 58 of the armature 52 engages the associated center post 62 and the associated plunger 34 is in its lowered position. In one application, the predetermined air gap is nominally $\frac{4}{1000}$th inch. A proper air gap is required to ensure proper functioning of the solenoid assembly 10 over an extend period of time.

To establish the proper air gap between the armature 52 and the outer post 68, the present invention includes a first general step 100 of establishing a reference plane including first and second portions 88 and 90 of the upper surface of the core 76. In the exemplary embodiment, the first and second portions 88 and 90 are the upper surfaces of the associated outer post 68 and center post 66, respectively.

In a second general step 102, the method of the present invention includes measuring the vertical height of the plunger 34 in its lowered position relative to the reference plane. In the exemplary embodiment, the first and second steps are carried out with a linear variable transducer (not shown) of conventional construction. However, those skilled in the art will appreciate that other known measuring techniques may alternatively be employed.

In a third general step 104 of the present invention, the armature 52 is vertically adjusted such that the predetermined air gap exists. In the exemplary embodiment, the pin 54 is disposed within the aperture 55 to establish the predetermined air gap. Specifically, once the relative height of the plunger 34 to the reference plane is established, the pin 54 is positioned accordingly within the aperture 55 such that when a lower end of the pin 54 engages the plunger 34 in its lowered position, the predetermined air gap is present between the first portion 88 and the armature 52. In the exemplary embodiment, the portions of the armature 52 positioned adjacent the first and second portions 88 and 90 of the upper surface of the core 76 are coplanar.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A solenoid assembly for an automatic transmission of a motor vehicle, the solenoid assembly comprising:

a housing including a core opening passing vertically therethrough;

a valve mounted within said housing, said valve operative in a vented state and a non-vented state, said valve including a plunger movable between a first position for establishing said vented state and a second position for establishing said non-vented state;

an armature associated with said valve movable in response to the presence and absence of a magnetic field for selectively moving said plunger of said valve between said first and second positions;

an electromagnetic arrangement for creating said magnetic field, electromagnetic arrangement including a core and an energizable coil, said core disposed in said core opening;

a first retaining member retaining a portion of said core against an underside of said housing, wherein said first retaining member is secured to said underside of said housing.

2. The solenoid assembly for an automatic transmission of a motor vehicle of claim 1, wherein said core includes at least one horizontally extending segment which directly abuts said underside of said housing.

3. The solenoid assembly for an automatic transmission of a motor vehicle of claim 2, wherein said core includes a plurality of stacked plates.

4. The solenoid assembly for an automatic transmission of a motor vehicle of claim 2, wherein said core includes a plurality of vertically stacked plates.

5. The solenoid assembly for an automatic transmission of a motor vehicle of claim 1, further comprising a second retaining member disposed adjacent an upper side of said housing and opposing upward movement of said valve.

6. The solenoid assembly for an automatic transmission of a motor vehicle of claim 5, further comprising an O-ring upwardly biasing said valve against said second retaining member.

7. The solenoid assembly for an automatic transmission of a motor vehicle of claim 1, wherein the first retaining member is a screen carrier.

8. A solenoid assembly for an automatic transmission of a motor vehicle, the solenoid assembly comprising:

a housing including a core opening passing vertically therethrough;

a valve mounted within said housing, said valve operative in a vented state and a non-vented state, said valve including a plunger movable between a first position for establishing said vented state and a second position for establishing said non-vented state;

an armature associated with said valve movable in response to the presence and absence of a magnetic field for selectively moving said plunger of said valve between said first and second positions;

an electromagnetic arrangement for creating said magnetic field, electromagnetic arrangement including a core and an energizable coil, said core disposed in said core opening;

a first retaining member retaining a portion of said core against an underside of said housing; and a second retaining member disposed adjacent an upper side of said housing and opposing upward movement of said valve.

9. The solenoid assembly for an automatic transmission of a motor vehicle of claim 8, wherein said core includes at least one horizontally extending segment which directly abuts said underside of said housing.

10. The solenoid assembly for an automatic transmission of a motor vehicle of claim 9, wherein said core includes a plurality of stacked plates.

11. The solenoid assembly for an automatic transmission of a motor vehicle of claim 9, wherein said core includes a plurality of vertically stacked plates.

12. The solenoid assembly for an automatic transmission of a motor vehicle of claim 8, further comprising an O-ring upwardly biasing said valve against said second retaining member.

* * * * *

UNITED STATES PATENT AND TRADEMARK OFFICE
CERTIFICATE OF CORRECTION

PATENT NO : 6,138,713
DATED : October 31, 2000
INVENTOR(S): Roy S. Nassar et al.

It is certified that error appears in the above-identified patent and that said Letters Patent is hereby corrected as shown below:

ON THE TITLE PAGE

Item [73] Assignee should read -- DaimlerChrysler Corporation
Auburn Hills, Michigan Signed and Sealed this Eighth Day of May, 2001

Attest:

NICHOLAS P. GODICI

Attesting Officer

Acting Director of the United States Patent and Trademark Office